Dec. 21, 1965 IZUMI OSAWA ETAL 3,225,135

METHOD AND APPARATUS FOR MONITORING A TELEVISION TAPE RECORDING OPERATION

Filed June 7, 1961

INVENTORS
Izumi Osawa and
Saneyuki Takeuchi
BY
Michael S. Striker
Attorney 3,225,135
Patented Dec. 21, 1965

3,225,135

METHOD AND APPARATUS FOR MONITORING A TELEVISION TAPE RECORDING OPERATION

Izumi Osawa and Saneyuki Takeuchi, Tokyo, Japan, assignors to Fuji Telecasting Co., Ltd., Tokyo, Japan Filed June 7, 1961, Ser. No. 115,447
Claims priority, application Japan, June 25, 1960, 35/28,800
4 Claims. (Cl. 178—6.6)

This invention relates to a method and an apparatus for monitoring the operations of a magnetic television recorder. Since previously there has been no simple method and apparatus for monitoring and thus immediately establishing whether the recording of the television program onto the video tape is proceeding in a successful manner or not, the recorded tape had to be reproduced on the television monitor receiver to examine its recorded state after the recording of the program was completed. This was very inconvenient and at the same time defects in video tape recording would not only cause unreliable operation but would often lead to various difficulties in broadcasting, especially in the case of color video tape recordings.

The object of this invention is to overcome these conditions and to enable monitoring of the operations of the magnetic television recorder.

Another object of this invention is to provide an apparatus which can record and monitor the recording simultaneously, and at the same time can monitor the control track conditions by operation of a switch.

The invention will be described further, by way of example, with reference to the accompanying drawings, in which.

Figure 6:
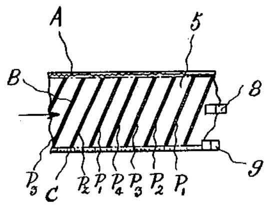
FIG. 6 is a sectional view showing one embodiment of the recorded video tape track.

The head which is used for the video tape recording generally comprises one or several members arranged at regular intervals on a revolving drum, and by giving to the tape 5 a speed synchronous with the revolving speed of the drum can accommodate the video track on the tape 5 as shown in FIG. 6. FIG. 6 shows an example of a video pattern B taken by four head members. As shown in the Figure, the head members record successively from $P_1$, the video track for the channel 1, to $P_4$, the video track for the channel 4.

Therefore, when the recorded tape is rewound, it is necessary to make certain that the recording level of each track, the interval and the balance of the recording level between each track, and the recording level of the control track C are in a perfect operating condition. In order to meet these conditions, a video track monitoring head 8 and a control track monitoring head 9 as shown in FIG. 1 are adapted for simultaneous recording and monitoring.

Figure 1:
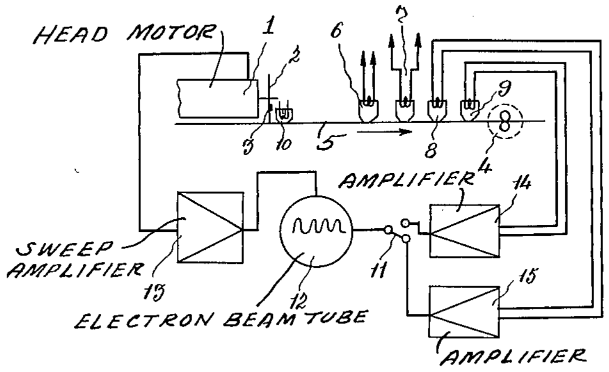
FIG. 1 is a schematic diagram showing the arrangement of one of the embodiments of the invention.
Figure 4:
FIG. 4 is a diagram showing an example of wave forms which appear on the monitoring Braun tube depicting the output of the video tape monitoring head.

In FIG. 1, one head member 3 of a plurality thereof is shown fixed on a rotor 2 carried by the shaft of a video head motor 1. A tape feed motor 4 is caused to run with a speed synchronous with that of the motor 1 so as to cause the tape 5 to move in the direction shown by the arrow. In this condition, when the head member 3 is energized by video signals, the audio recording head 7 is energized by audio signals after the audio erasing head 6 and the control track head 10 is energized by signals synchronous with those applied to the video head 3, and the magnetized pattern 3 is produced on the tape 5 as shown in FIG. 6, if the condition and signal output of each head together with the predetermined conditions between the tape 5 and each head correspond. Then, the video signals recorded on the tape 5 are picked up by the video monitoring signal-pick-up head 8, amplified by the amplifier 15, and by properly setting the switch 11 a transverse beam deflection is produced on the Braun or electron-beam tube 12 which is swept horizontally by signals synchronous with the rotation of the video head motor 1. Wave forms W appear on the Braun tube 12 and have several peaks as shown in FIG. 4 corresponding to the number of head members 3 on the rotor 2; in this embodiment there are four such head members.

By observing the peaks of the wave form W, one can see plainly the video recording conditions. For instance, if one of these peaks is lacking, the head member 3 which corresponds to the lacking peak is defective—that is, the head member 3 on the rotor 2—and if the amplitudes of these peaks are not uniform, there is an unbalance in the energizing current of at least one of the heads, and moreover, when these peaks shift sideways considerably, it shows that the tape 5 does not move smoothly, and furthermore the relative location of the head member 3 on the rotor 2 is checked by the intervals between these peaks. Reference numeral 13 shows the sweep amplifier and phase shifter which produces the horizontal sweep on the monitoring Braun tube 12 synchronous to the video head signals.

Figure 5:
FIG. 5 is a diagram showing another example of wave forms which appear on the monitoring Braun tube depicting the output of the control track monitoring head.

Moreover, as it is also necessary to monitor the recording conditions of the control track C, a control track pick-up head 9 is added in this arrangement which makes it possible by changing the switch 11 to a second position to observe the signals picked up by 9 on the Braun tube 12 after amplification by the amplifier 14. FIG. 5 shows an example of the thus indicated wave form *w*.

Figure 2:
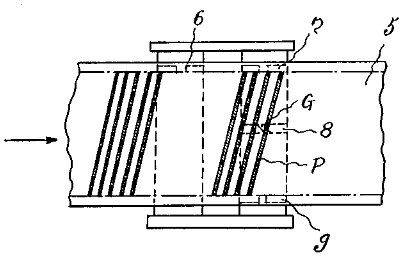
FIG. 2 is a sectional side view showing the installation of the monitoring head.
Figure 3:
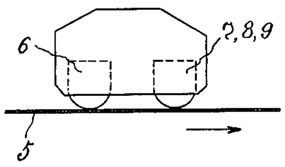
FIG. 3 is a sectional plan view showing the same embodiment as in FIG. 2.

In FIG. 2 and FIG. 3, one can see an example showing a practical embodiment for each head member. The designations in the Figures are the same as those in FIG. 1. The gap G on the video monitoring head 8 is to be given in such direction that a part of the recorded pattern P on the tape 5 can be converted into a signal.

Since, according to this invention, it is possible to display the signals from the video monitoring head 8 or the signals from the control track pick-up head 9 as the wave forms W or *w* respectively on the monitoring Braun tube at the time of the recording, one can record the video tape without any difficulty by observing these wave forms as indicated. Any irregularity of a part of the apparatus can be detected directly as an irregularity of the wave forms W or *w*, and the recording can be executed in a reliable and exact manner, unlike the old system which permits to discover such irregularities of the recording for the first time only upon observing the video picture when it is reproduced.

This invention may be carried out in other ways or embodied in other forms without departing from the spirit or essential characteristics thereof, the scope of this invention being indicated by the appended claims rather than by the foregoing description, and all changes which come within the meaning and range of equivalency in the claims are therefore intended to be embraced therein.

What we claim is:

1. An apparatus for monitoring a television tape recording operation, comprising, in combination, magnetic tape recording means for producing, in accordance with received television signals, on a tape moving at a predetermined speed a recording of said television signals; stationary monitoring pick-up head means arranged along the path of said moving tape for producing output signals based on said recordings of said television signals; and oscilloscope means connected with said magnetic tape recording means and with said monitoring pick-up head means for producing an oscillographic display of said output signals whereby irregularities of the recording of said television signals are made visible during a tape recording operation.

2. An apparatus for monitoring a television tape recording operation, comprising, in combination, magnetic tape recording means including a plurality of rotating video signal recording heads for producing, in accordance with received television signals, on a tape moving at a predetermined speed a recording of video signals contained in said television signals, said recording of said video signals extending along track portions transverse of said tape, each track portion in sequential groups of said track portions being produced by an individual head, respectively, of said plurality of video signal recording heads; stationary monitoring pick-up head means arranged along the path of said moving tape so as to be passed successively by a selected portion of each of said track portions for producting output signals based on the amplitude of said recordings of said video signals as appearing at said selected portions of said track portions; and oscilloscope means connected with said magnetic tape recording means and with said monitoring pick-up head means for producing in synchronism with the rotation of said rotating video signal recording heads an oscillographic display of said output signals whereby irregularities of the recording of said television signals are made visible during a tape recording operation.

3. An apparatus for monitoring a television tape recording operation, comprising, in combination, magnetic tape recording means including a plurality of rotating video signal recording heads and a stationary control signal recording head for producing, in accordance with received television signals, on a tape moving at a predetermined speed a recording of video signals and control signals contained in said television signals, said recording of said video signals extending along track portions transverse of said tape, each track portion in sequential groups of said track portions being produced by an individual head, respectively, of said plurality of video signal recording heads, and said recording of said control signals being arranged along a control signal track extending longitudinally of said tape; stationary monitoring pick-up head means including a first pick-up head means arranged along the path of said moving tape so as to be passed successively by a selected portion of each of said track portions for producing first output signals based on the amplitude of said recordings of said video signals as appearing at said selected portions of said track portions, and second pick-up head means arranged along the path of said control signal track for producing second output signals corresponding to said control signals; and oscilloscope means connected with said magnetic tape recording means and with said monitoring pick-up head means for producing in synchronism with the rotation of said rotating video signal recording heads an oscillographic display of said output signals whereby irregularities of the recording of said television signals are made visible during a tape recording operation.

4. An apparatus for monitoring a television tape recording operation, comprising, in combination, magnetic tape recording means including a plurality of rotating video signal recording heads and a stationary control signal recording head for producing, in accordance with received television signals, on a tape moving at a predetermined speed a recording of video signals and control signals contained in said television signals, said recording of said video signals extending along track portions transverse of said tape, each track portion in sequential groups of said track portions being produced by an individual head, respectively, of said plurality of video signal recording heads, and said recording of said control signals being arranged along a control signal track extending longitudinally of said tape; stationary monitoring pick-up head means including a first pick-up head means arranged along the path of said moving tape so as to be passed successively by a selected portion of each of said track portions for producing first output signals based on the amplitude of said recordings of said video signals as appearing at said selected portions of said track portions, and record pick-up head means arranged along the path of said control signal track for producing second output signals corresponding to said control signals; and oscilloscope means connected with said magnetic tape recording means and including switch means for connecting in one position said oscilloscope means with said first pick-up head means and in a second position with said second pick-up head means for producing in synchronism with the rotation of said rotating video signal recording heads in said first position of said switch means an oscillographic display of said first output signals, and in said second position an oscillographic display of said second output signals whereby irregularities of the recording of said television signals are made visible during a tape recording operation.

References Cited by the Examiner

UNITED STATES PATENTS

| | | | |
|---|---|---|---|
| 3,030,441 | 4/1962 | Nemeth | 178—6.6 |
| 3,031,525 | 4/1962 | Oniki | 178—6.6 |
| 3,051,777 | 8/1962 | Lemelson | 178—6.6 |

DAVID G. REDINBAUGH, *Primary Examiner.*

E. JAMES SAX, *Examiner.*